April 16, 1935.  F. HENNIG  1,997,683
ANTIPARASITIC SYSTEM FOR TELEGRAPH SIGNALS WITH
ELECTROSTATIC STORING OF SIGNALS
Filed June 20, 1931
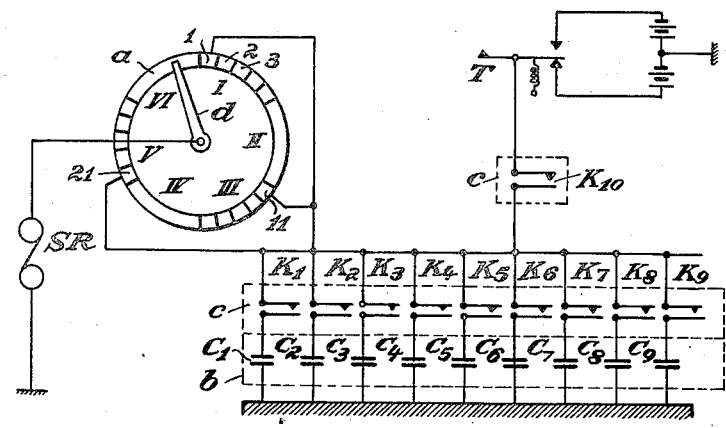
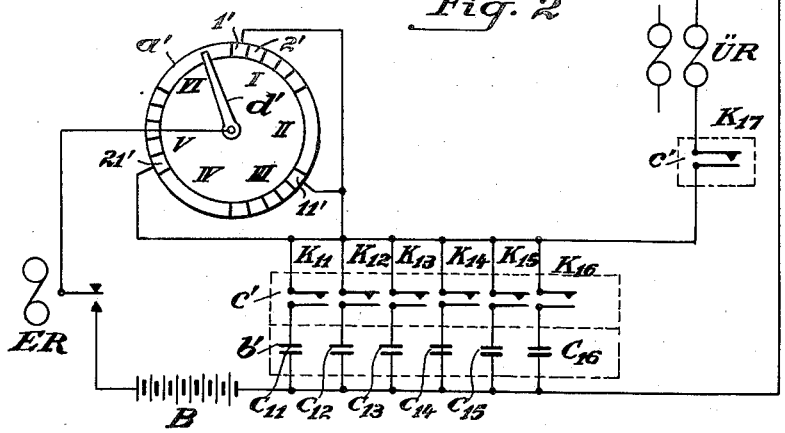
Inventor:
Fritz Hennig
By Brown, Jackson, Boettcher & Dienner
Attys.

Patented Apr. 16, 1935

UNITED STATES PATENT OFFICE 1,997,683

ANTIPARASITIC SYSTEM FOR TELEGRAPH SIGNALS WITH ELECTROSTATIC STORING OF SIGNALS

Fritz Hennig, Berlin-Siemensstadt, Germany, assignor to Siemens & Halske, Aktiengesellschaft, Siemensstadt, near Berlin, Germany, a corporation of Germany Application June 20, 1931, Serial No. 545,699
In Germany October 29, 1930

16 Claims. (Cl. 250—8)

This invention is concerned with provisions for filtering out or eliminating from a series of repeated telegraph signs or signals, those which are distorted by atmospheric interferences or by the effects of fading.

It is known, in the case of telegraphy, to combine every sign or signal to be transmitted— (letter, figure, or the like)—of a similar number of signal parts or portions, for example, of five parts or portions. The sign or signal portions are usually sender impulses or, in the case of wireless telegraphy, sender pauses.

It occurs frequently, in wireless telegraphy, that the signal parts are distorted, due to atmospheric causes or due to fading. Fading might reduce or might completely obliterate the sender impulses, and atmospheric interference might change sender pauses into impulses. In order to avoid either drawback, and in view of the fact that either kind of trouble is usually of short duration, the whole sign or signal—(therefore, in case of five signal parts, each of the five parts)—is transmitted repeatedly in predetermined time intervals, and the receiver is adapted to operate so that a wrong reproduction of the signs or signals is only possible when a certain signal part is distorted during each transmission. This operation is possible, in case atmospheric interference, i. e., the occurrence of an additional impulse during the sender pause, is to be expected, by energizing an electro-magnet in the receiver corresponding to each received impulse. This magnet causes an imprint or perforation on a tape, and the "$n$" tapes, thus imprinted or perforated according to the "$n$" transmissions of the identical sign or signal, are then placed accurately in registry with each other. A test device is then used for noting the reception of an impulse only if all the "$n$" tapes are perforated at the same place. A perforation caused by atmospheric interference in one or more—(not occurring in all)—of the "$n$" tapes, will then be unable to cause a wrong operation of the receiving device. The same principle may be employed in case of fading, by perforating a tape in accordance with each sender pause and by using a device to register a pause only upon identical perforation of all tapes. Thus, if a sender impulse is missed, due to fading, it would not cause a faulty registering of the device.

The signs or signals are stored prior to transmission and after their reception in order to accomplish the repeated automatic sending of the same signals in the sender, and in order to permit comparison of the repeatedly transmitted signals in the receiver. In the known devices, the storing is accomplished mechanically, for example, by means of perforated tapes, or electromagnetically, for example, by means of relay chains or by the use of mechanical storing devices cooperating with electro-magnets, or finally, by means of registering the signs or signals electro-magnetically upon steel tapes. These known storing methods have the disadvantage of requiring a considerable amount of equipment containing sensitive mechanically or electro-magnetically actuated parts which are particularly subject to great wear and various external influence.

A further, and particular drawback of the known storing means resides in the fact that, for example, in case of fading, a small reduction in the strength of an impulse occurring during all transmissions might cause a distortion of the signal even if the fading is trifling, but yet great enough to prevent perforation by the force of the remaining portion of the impulse. A relatively small trouble occurring during each transmission would, in such a case, occasion a distortion in the reproduction of the signal.

In accordance with the present invention, the telegraph signs or signals are stored electrostatically in an arrangement for filtering out or eliminating from a series of repeated signals, those signs or signals which are distorted by atmospheric interference or by fading.

Electro-static storing of impulses is known in telegraphy. However, by employing the idea of such storing in connection with devices for filtering or eliminating disturbances, it is possible to achieve a greater reliability of operation. This is due to the fact that the electro-static storing can be made to function so that partially distorted signal parts cause the same effect as non-distorted signal parts.

A further advantage of the electro-static storing according to the present invention resides in the small time period required for charging the condensers employed in connection with this novel method.

The accompanying drawing shows in schematic representation an example of carrying out the invention.

In the drawing,

Fig. 1 shows part of a sender equipment; and
Fig. 2 shows part of a receiver equipment.

It is assumed, that the storing takes place electro-statically at the sending as well as at the receiving end. However, it should be understood that this is not absolutely essential for achieving an improvement over the known and previously used methods. The equipment shown in the drawing serves for transmitting signs or signals composed of five signal parts or portions. These signal parts are positive and negative impulses within the sending equipment, and sender impulses and pauses within the wireless stretch as well as within the receiving equipment. It is further assumed that a signal to be transmitted is divided into its five component parts and thus transposed upon a perforated tape. Each of these tapes cooperates with a selecting lever. It will be apparent, therefore, that each of these levers registers with one of the parts of the sign or signal to be transmitted.

It is further assumed that the sign or signal is transmitted three times, that is to say, that it is repeated twice. It will be rarely necessary to transmit more than three times in practical operation. If the probability of trouble occurring during one transmission is designated by "$p$", the mathematic probability that all transmissions take place similarly distorted in case of "$n$" transmissions is but "$p^n$". If, for example, $p=1\%$, the frequency of trouble with one repetition of the transmission will be lowered to 0.01%, with two repetitions, i. e., three transmissions, it will be down to 0.0001%.

A rotating contacting device, such as indicated at $a$ and $a'$, respectively, is individual to the sender, as well as to the receiver equipment. Each equipment is also provided with a series of control contacts shown at $c$ and $c'$, and with a series of condensers $b$ and $b'$, respectively. The rotary contact device comprises a circular contact ring, subdivided into segments of contacts. Contact arms such as $d$ and $d'$ respectively, are adapted to establish connections with these segmental contacts. The contact arms $d$ and $d'$ are operated in synchronism. This may be accomplished in several well known ways, for example, by operating the contact arms by means of synchronous motors. The operation of the contacts $c$ and $c'$ is controlled to take place in a predetermined ratio or sequence with respect to the operation of the contact arms $d$ and $d'$. This actuation, i. e., the controlled closing and opening of the contacts $c$ and $c'$, may be achieved by means of cams which may be coupled by suitable gears with the mechanism for actuating the contact arms. The control of the perforated tape containing the signs or signals to be transmitted, is also in dependence of the contact arm $d$. This tape, it will be recalled, cooperates with five selecting members corresponding to the five parts of which each sign or signal is composed. These selecting members may also be termed transmitter members, since their function determines the transmission of the signs or signals or parts thereof which appear perforated on the tape. Only one of the five selecting members is shown in Fig. 1 for the sake of clarity, and it is designated there by the reference character T. It serves to establish contact with the first part of a sign or signal on the perforated tape.

The rotary contact devices $a$ and $a'$ are adapted for alternate sending and receiving, respectively, of two messages. The sectors I, III, and V are used for sending and receiving one message, and the sectors II, IV and VI for the sending and receiving of another message. In order to keep the drawing simple and lucid, I have shown only the means required for sending and receiving one message. Each of the sectors I, III, and V is shown subdivided into five segments according to the five parts of each sign to be transmitted. The sectors I and IV serve for sending and receiving, respectively, of the first transmission, the sectors II and V for the second transmission, and the sectors II and VI for the third transmission of the same sign or signal. It will be apparent, therefore, that the first repetition of the same signal occurs after 2⅓ rotations of the contact arm $d$, and the second repetition occurs again after 2⅓ rotations.

The sending of such a series of repeated signals will now be explained with reference to Fig. 1. In the moment when the contact arm $d$ brushes over the segment 1 of the sector I, the transmission selecting member T, which contacts the first of the five signal parts, is connected to the negative or the positive pole of the battery which is grounded as shown, the potential to which the member T is then connected being dependent upon the perforation of the tape containing the message. Two of the contacts $K_1$ to $K_9$, for example, the contacts $K_1$ and $K_4$, and also the contact $K_{10}$ are closed at that same instant, due to the previously mentioned predetermined interaction between the control for the contacts $c$ and the actuating mechanism of the contact arm $d$. Paths for the flow of current are therefore, established from ground (at the battery) over the member T, contact $K_{10}$, and from there by way of contact $K_4$ and condenser $C_4$ to ground, also over contact $K_1$ and condenser $C_1$ to ground, and finally over segment 1 of sector I, contact arm $d$, winding of sender relay SR, to ground. Depending upon the poling of its contacts, the sender relay will cause upon the sender the transmission of a sender impulse or a sender pause. As a further result, the condensers $C_1$ and $C_4$ will be charged. In order to prevent discharging of the condensers $C_1$ and $C_4$ immediately after the charging thereof, care is taken that the charging potential is connected to the condensers for a short time after the contact arm $d$ has passed over the segment 1, this being accomplished by the cooperation of the control mechanisms as previously mentioned.

The discharge circuit for the condensers $C_1$ and $C_4$ over the sender relay SR is interrupted and the contacts $K_1$, $K_4$ and $K_{10}$ are opened, while the contact arm $d$ brushes over the segment 2. Connected to the segment 2 during the time the contact arm $d$ brushes over this segment, is a circuit including a second transmitter selecting member such as T, and a corresponding series of condensers and contacts, similarly as described, transmitting to segment 2 a negative or a positive potential, and thereby causing the sender relay SR to transmit for the first time, the second part of the signal.

The transmission of the third and fourth and fifth parts of the sign or signal takes place successively in substantially the same way. The contact arm $d$ then brushes over the sectors II and III without causing the transmission of any signal. Upon brushing over the sector IV, the equipment causes the transmission of the first signal of the second message. No transmission occurs while the contact arm brushes over sectors V and VI. After exactly one revolution, the transmitter selecting member T is in contact with the first part of the second signal or sign on the tape. Contact $K_{10}$ and two of the contacts $K_1$ to $K_9$, for example, the contacts $K_5$ and $K_2$, are closed at this moment.

The transmission and the double storing of the second signal is now accomplished in the same manner as was the transmission and the double storing of the first part of the first sign, a revolution prior to this instant of operation. The transmission and storing of the first part of the third signal takes place in the same manner after a further revolution of the contact arm $d$, whereby the storing takes place in the condensers $C_3$ and $C_6$. After a ⅓ revolution, i. e., 2⅓ revolutions after selection of the first part of the first signal, the contact arm $d$ will be on the segment 11 of sector III. In the row of contacts $c$, only contact $K_1$ is now closed, and the condenser $C_1$ is discharged over contact $K_1$, segment 11, contact arm $d$ and relay SR. This relay causes now, the first repeating of the first part of the first signal.

Upon further rotation of the contact $d$, and upon arriving for the third time after the initial transmission at the segment 1 of sector I, the contact $K_{10}$ and the contacts $K_7$ and $K_8$ are closed. The first transmission of the first part of the fourth signal is now carried out. After a further full revolution, the condensers $C_9$ and $C_1$ will store the first part of the fifth signal, and ⅔ revolutions thereafter, occurs the discharge of the condenser $C_4$, and therefore, the second repeating of the first part of the first signal by way of contact $K_4$, segment 21 of sector V, contact arm $d$ and sender relay SR. The series of repeating the first part of the first signal is now concluded.

It will be apparent that it is possible to transmit over the equipment during the interval between the first selection and first repetition thereof thirteen further signs or signals, i. e., six further signs of the same message and seven signs or signals of the second message.

The operations at the receiving end take place in a similar manner. It should be borne in mind that the contact arms $d$ and $d'$ move in synchronism. The contact arm $d'$ in the receiver will, therefore, cause a registering of the sender impulse or of a sender pause at the receiver relay ER, whenever an impulse is sent by the sender relay SR, depending upon the position of the contact of the receiver relay.

It shall be assumed, for the purpose of description, that the sender relay SR transmits a sender impulse to the transmitting equipment at the time of selection of the first part of the first signal, and that fading is to be expected over the wireless stretch of the transmission. Fading could cause a weakening of the sender impulse, and consequently distortion of the transmitted signal. The receiver relay, is therefore, poled in such a manner that upon arrival of the impulse, its armature will be connected to the battery B, while during a sender pause—(that is, during the arrival of a signal which can not be altered by fading)—it is connected with the dead contact as shown. In the moment of first transmission of the first part of the first signal, the contact arm $d'$ in the receiver will brush over the segment 1 of sector I. One of the contacts in the row $c'$, for example, $K_{11}$ is closed. A circuit exists, therefore, extending from the negative terminal of battery B, armature of the receiver relay ER, contact arm $d'$, segment 1, contact $K_{11}$, condenser $C_{11}$, and back to positive terminal of the battery B. Condenser $C_{11}$ will be charged. After 2⅓ revolutions, that is, in the moment when the sender relay SR causes the first repeating of the first part of the first signal, the contact arm $d'$ is in engagement with the segment 11' of sector III. Contact $K_{11}$ is again closed and the condenser $C_{11}$ is connected for the second time to battery B. This operation is repeated for another cycle after further 2⅓ revolutions.

The condenser $C_{11}$ is so dimensioned that a single connection to battery B is sufficient to cause its charging to full capacity. If two of the three impulses are obliterated due to fading, that is to say, if only one impulse of the series of impulses is registered by the receiver relay ER, this one impulse will have caused a complete charging of condenser $C_{11}$. It will discharge upon closure of contact $K_{17}$ to a translator relay ÜR in the same way as if all three impulses had arrived with no distortion or trouble.

The receiver apparatus proper which is controlled by the translator relay ÜR will, therefore, register the transmitted sign correctly, even in the case when of three transmissions only one arrived without trouble.

In view of the fact that the charging time of the condensers is extraordinarily short, an impulse will suffice for charging the condensers at the receiving end, even if it should be partly obliterated by fading. Such a partially distorted impulse will therefore cause the same operation in the receiver as an impulse which is not distorted at all.

The discharge of the storing condensers in the receiver takes place preferably simultaneously with the arrival of the last signal repetition, so that it is necessary to store merely the first sending and the first repeating, while the last repeating is caused to act directly upon the translation relay ÜR. The condenser $C_{12}$ serves for storing the transmissions of the second part of the first signal; condenser $C_{13}$ takes care of the third part of the first signal, etc. In accordance with the storing of the signals at the receiving end by one condenser, it is not required to provide in the receiver nine condensers—(per signal part as is the case in the sender)—but only six condensers. In order to provide for proper discharge in the condensers of the receiver, the time interval required by the contact arm $d'$ for the storing of segments 1', 2', etc., is smaller than the time for closing the contacts in the row $c'$.

All impulses which must be accurate with respect to the start and duration are under the control of the rotary devices $a$ and $a'$, respectively. The storing contacts $c$ and $c'$ are, therefore, preparatory contacts, and admit relatively great latitude of accuracy of operation. The mechanisms for actuating these contacts can, therefore, be quite simple.

I claim:

1. A method for eliminating parasitic telegraph signals from a series of repeated signals, consisting of transmitting a signal, of electro-statically storing said signal, and of subsequently automatically retransmitting said electro-statically stored signal.

2. A method for eliminating telegraph signals distorted by atmospheric disturbances or by fading and the like, consisting of selecting a signal for transmission, of transmitting said signal, of simultaneously storing said signal electro-statically, and of automatically transmitting said electro-statically stored signal.

3. A method for transmitting telegraph signals, consisting of selecting said signals for transmission, of transmitting said signals, of electro-statically storing said signals, and of subsequently automatically transmitting said electro-statically stored signals.

4. The method of transmitting telegraph signals at a sending station and of receiving said signals at a receiving station, consisting of selecting a signal for transmission, of transmitting said signal, of electro-statically storing said signal at the sending station, of receiving said signal at the receiving station, of storing said signal electro-statically at said receiving station, of 5. In a telegraph system of the class described having a sending and a receiving station, sender contact means in said sending station for relaying impulses to be transmitted to said receiving station, condensers, means for connecting a plurality of said condensers with said sender contact means for multiple electro-static storing of each of said impulses, means for successively discharging said condensers for repeating each of said impulses, contact means in the receiving station for relaying received impulses, a single condenser means at the receiving station for individually storing each received impulse, translator means and means for discharging said condenser at the termination of said impulse repeating series for actuating said translator means.

6. In a telegraph system of the class described, a sending station for transmitting impulses, a plurality of condensers in said sending station for electro-statically storing each impulse a plurality of times, means for discharging said condensers successively to transmit a series of repeating impulses, a receiving station for receiving said impulses, a single condenser in said receiving station for electro-statically storing the impulses of said series, translator means, and means for discharging said condenser to actuate said translator means.

7. In a telegraph receiving station of the class described, a distributor for relaying a series of impulses transmitted from a sending station, a condenser for electro-statically storing the impulses of a series, means for translating said impulses, and means for discharging said condenser to actuate said translating means prior to the cessation of impulse reception by said distributor, the last impulse received being distributed directly to said translator.

8. In a telegraph system, means for sending impulses, means for electro-statically storing each impulse a plurality of times simultaneously with the transmission of said impulse, and means for successively releasing said stored impulses for the repeated transmission thereof.

9. In a telegraph system wherein each impulse is transmitted a plurality of times, the method of eliminating distorted impulses of a series of said impulses, consisting in electro-statically storing said impulses until the transmission of said series of impulses is terminated and automatically retransmitting said stored impulses.

10. A telegraph system wherein component elements cooperate to eliminate parasitic signals from a series of repeated signals comprising, a sender and a receiver, means in said sender for multiple electrostatic storing of each impulse, means for transmitting said stored impulses successively to said receiver, and means in said receiver for electrostatic storing of said received impulses.

11. A telegraph system wherein component elements coact to eliminate parasitic signals from a series of repeated signals, said elements comprising, a rotary mechanism, means controlled by said mechanism for selecting signals for transmission, means including said mechanism for transmitting said signals, condensers, contact means controlled by said mechanism for simultaneously conducting said signals to said condensers for electro-statically storing said signals, and means in said mechanism cooperating with said contact means for automatically transmitting said stored signals.

12. In a telegraph system, apparatus for transmitting and for receiving signals, said apparatus including means for eliminating from a series of signal transmissions the signals distorted by atmospheric disturbances or by fading and the like, said means comprising elements for sending signals and for simultaneously electro-statically storing each of said signals, and elements for separately transmitting each of said stored signals subsequent to the first sending thereof.

13. In a telegraph system of the class described wherein component elements coact to eliminate signals distorted by atmospheric disturbances or by fading and the like, a sending and a receiving station, apparatus at each of said stations for transmitting and for receiving signals, said apparatus including a rotary device comprising circularly arranged contacts and a wiper for engaging said contacts, and means provided at the sending station and cooperating with the apparatus thereat for electro-statically storing transmitted signals, said means comprising a plurality of condensers, control contacts therefor, and means governed by said rotary device for actuating said control contacts to effect the storing of said signals, said stored signals being subsequently released to repeat the transmission of said transmitted signals.

14. In a telegraph system wherein signals are repeatedly transmitted, a distributor comprising circularly arranged contacts and an element for operatively engaging said contacts for predetermined periods of time to effect the transmission of signals, means effective during said transmission for electro-statically storing said signals preparatory to the repeating thereof, contact means for controlling said storing means, and governing means for effecting the operative engagement of said distributor element with said distributor contacts in a predetermined ratio relative to the operative actuation of said contact means for causing the storing of said signals, said means coacting subsequently to effect the transmission of said stored signals.

15. In a telegraph system wherein signals are repeatedly transmitted, means including a movable wiper and contacts to be engaged thereby for transmitting said signals, means including control contacts for electro-statically storing said signals during the transmission thereof, means for simultaneously conducting said signals to said transmitting and to said storing means, and governing means for effecting the operative actuation of said control contacts for longer intervals of time than the operative engagement of said wiper with said contacts for effecting the storing of said signals, said means coacting subsequently to effect the transmission of said stored signals.

16. In a telegraph system including means for eliminating parasitic telegraph signals from a series of repeated signals, said means comprising, apparatus for selecting a signal for transmission, means for transmitting said signal, and a plurality of means for electro-statically storing said signal and for subsequently automatically retransmitting said signal.

FRITZ HENNIG.